United States Patent [19]

Stork

[11] Patent Number: 5,642,341
[45] Date of Patent: Jun. 24, 1997

[54] CD ROM APPARATUS FOR IMPROVED TRACKING AND SIGNAL SENSING

[75] Inventor: David G. Stork, Stanford, Calif.

[73] Assignees: Ricoh Corporation, Menlo Park, Calif.; Ricoh Company, Ltd., Japan

[21] Appl. No.: 309,105

[22] Filed: Sep. 20, 1994

[51] Int. Cl.$^6$ ................................................. G11B 7/09
[52] U.S. Cl. ........................................ 369/44.41; 369/44.37
[58] Field of Search .............................. 369/44.37, 44.38, 369/44.41, 44.42, 48, 47, 124; 375/11–14

[56] References Cited

U.S. PATENT DOCUMENTS 5,272,723  12/1993  Kimoto et al. ......................... 375/11
5,400,312   3/1995  Haraguchi ........................... 369/44.37

OTHER PUBLICATIONS

Donald G. Fink et al., *Electronics Engineers' Handbook*, Second Edition, McGraw–Hill Book Company, New York, pp. 20–67 through 20–69 (1982).
Erik S. Schetina, *The Compact Disc*, Prentice Hall, New Jersey, pp. 166–175.

*Primary Examiner*—Thang V. Tran
*Attorney, Agent, or Firm*—Blakely, Sokoloff, Taylor & Zafman

[57] ABSTRACT

A compact disc (CD) read sensor apparatus for reading data from a CD track uses multiple laser beams for performing both tracking and reading data. In one embodiment, two laser beams are used to track by controlling the radial position of the two beams that are nominally radially disposed towards opposite edges of the recorded track. A differential signal is used to obtain tracking information and a sum signal is used to produce a read signal. In another embodiment, three laser beams are used corresponding to prior art three beam systems using two beams nominally disposed towards opposite edges for tracking and a center beam for reading. The three beams are combined to form an enhanced read signal with an improved signal-to-noise ratio over that obtained by any one beam. The combining operation includes adjusting for any relative delays between the multiple beam signals detected by the photocells to produce synchronous laser beam signals followed by a summing operation that may optionally include optimal combining operations such as weighted summing, filtering, and neural network processing.

17 Claims, 12 Drawing Sheets

CD ROM APPARATUS FOR IMPROVED TRACKING AND SIGNAL SENSING

FIELD OF THE INVENTION

This invention relates to the reading and tracking of information recorded on compact disc (CD) read-only-memories (ROMs) and more specifically to the use of multiple laser beams for the tracking and reading of CD-ROMs.

BACKGROUND OF THE INVENTION.

CD-ROMs are manufactured for use in applications that require a ROM of very large capacity but do not require the modification of the recorded information such as the recording and playing of music and as well as the storage of encyclopedic computer data. Information may be stored as analog encoded data (typically FM) or as binary encoded data. Binary encoding is the preferred method for audio and computer data but they generally differ in the recording format and associated error correction technologies.

A typical CD is capable of storing up to 600 million bytes of information, an order of magnitude greater than a typical computer disk drive using a 120 mm (4.72 inch) diameter disc. Because of the extremely high density of tracks on the CD, reliable retrieval of data requires precision tracking of the serially recorded data. Laser beams are used for both reading as well as tracking the recorded data.

FIG. 1 shows an example of an early two-sided video disc that has video information encoded in a two-state frequency modulated carrier. A 300 mm disc provides 30 minutes of playing time per side. Two aluminum 0.04 μm thick recording surfaces (upper and lower) are bonded together by an adhesive layer and then protected on the upper and lower side by a 1.2 mm transparent base. The binary carrier is recorded as "pits" and "lands" in the reflective aluminum coatings. The track width is 0.4 μm (16 μ in) and tracks are separated by 1.6 μm (63 μ in). The pits are depressions of 0.1 μm in the reflective coating while the lands are the non-depressed track area between pits.

FIG. 2 shows the main optical assembly including the focus motor and objective lens assembly used to position the objection optics relation to the recording surface. A laser and beam forming assembly illuminates the disc recording surface through the objective lens and the reflected light is deflected by a beam splitter through a cylinder lens to a quadrant photo-detector that is used to sense the state (pit-land) of the recorded track and to adjust the focus by a feedback control signal that adjusts the objective lens position by means the d'Arsonval motor assembly.

This basic method of illuminating, focusing and reading the recorded data is common to all CD-ROMs regardless of the field of application. The actual configuration and data format may vary depending on the application.

Tracking of recorded data tracks on the CD is usually accomplished by one of two methods that use either a single-spot or a multi-spot laser.

The single-spot method of tracking uses one laser beam for both reading and tracking. The lateral position of the beam relative to the track, is modulated (dithered) by a symmetric signal (typically 600 Hz sine wave) producing a small spot deviation ($\approx \pm 0.05$ μm) which may be detected by the differences between the two photo-detectors of the quadrant photo-detection of FIG. 2 that are associated with detecting lateral signal contributions. If the laser spot is centered on track, the two lateral photo-detectors should each detect equal affects of the 600 Hz dither. If the laser spot is off-center, one of the two lateral photo-detectors will see a larger affect than the other indicating that the spot is off center-track in the direction associated with the lateral photo-detector receiving the largest 600 Hz component as indicated in FIG. 3.

FIG. 4 shows the single-spot laser method in FIG. 4(a) and the three-spot method in FIG. 4(b). Multi-spot tracking typically uses three laser spots as shown: a center laser spot for reading and a left and right laser spot for detecting the left and right edges of the tracks pits. The center laser spot acts as the source of illumination used to read the recorded data and to provide the necessary focusing information from the four quadrant photo-detector shown in FIG. 2. Tracking spots A and B are placed so that one is centered on one of the lateral edges of the track pits ahead of the spot C and the other is centered on the other lateral edges of the track pits behind spot C. When the CD-ROM is tracking properly, the placement of the spots is as shown in FIG. 4(b). In order to produce tracking spots A and B, two additional laser beams are generated from a common laser source by use of a prism and sent along with the center beam to the recording surface through common optics and the three reflections are diverted by the beam splitter (FIG. 2). Tracking spots (A,B) are each detected by a tracking photo-detector, one mounted to either side of the quadrant photo-detector. The average absolute output of the tracking photo-detectors is equal when spot C is centered on the track and off-balance when not centered. The direction of the off-balance is indicated by the tracking photo-detector sensing the smallest average absolute signal level. The difference of the two tracking sensors is used to control a tri-beam deflection mechanism for centering spot C. In another variation, spots A and B may be used for tracking and focusing, leaving center spot C for data reading only.

The multi-spot tracking method is considered superior to the single-spot method because of the more robust tracking control signal produced which allows the tracking servo-system to respond more rapidly and maintain better tracking control.

The current invention is directed towards improving the multi-spot tracking and reading method by enhancing the data signal by appropriately combining the center and two tracking spot reflected signals without pre-empting the use of the two tracking spot reflected signals normal usage.

SUMMARY AND OBJECT OF THE INVENTION

A CD multi-spot tracking system provides a quick and reliable response to any tracking errors that may occur because of the greater sensitivity to tracking errors provided by the two tracking spots. Recognizing that the two tracking spots contain recorded data as well as track edge information, it is an object of this invention to combine the tracking spot signals with the center data spot signal in order to produce a data signal of improved signal to noise ratio while allowing the two tracking spot signals to be used in the conventional way for tracking.

It is a further object to increase the bandwidth and bit packing storage density by using the improved data signal to noise ratio.

Another object is to provide an improved data signal from a recorded CD that is compatible with existing CD formats.

Another object is to provide an adaptive multi-spot tracking system that may be used with existing CD systems.

DETAILED DESCRIPTION

Figure 1:
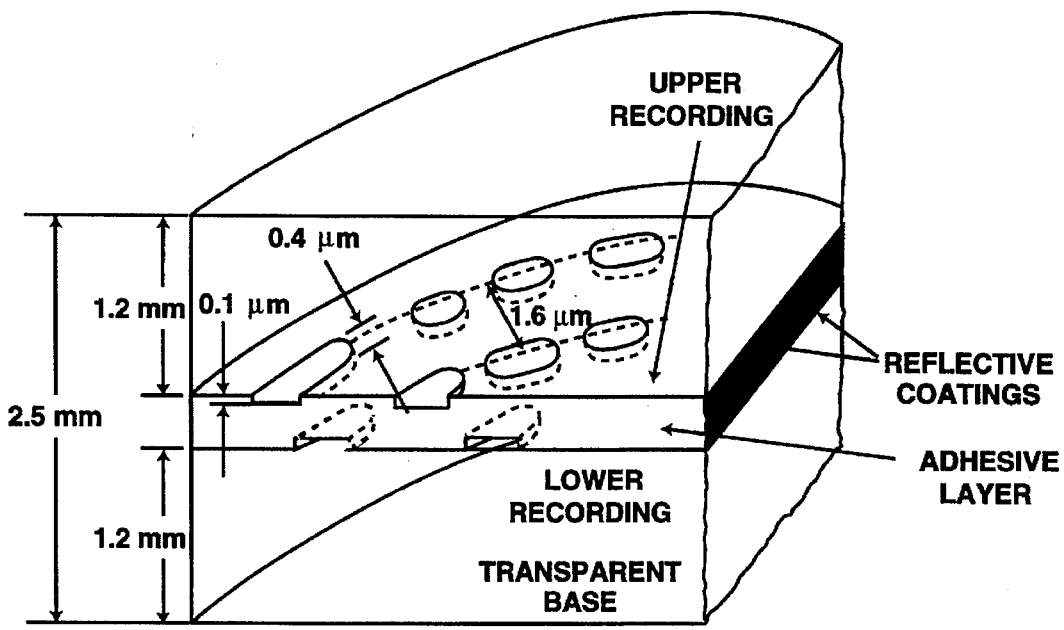
FIG. 1 is an example of a two-sided CD used for video data storage.
Figure 2:
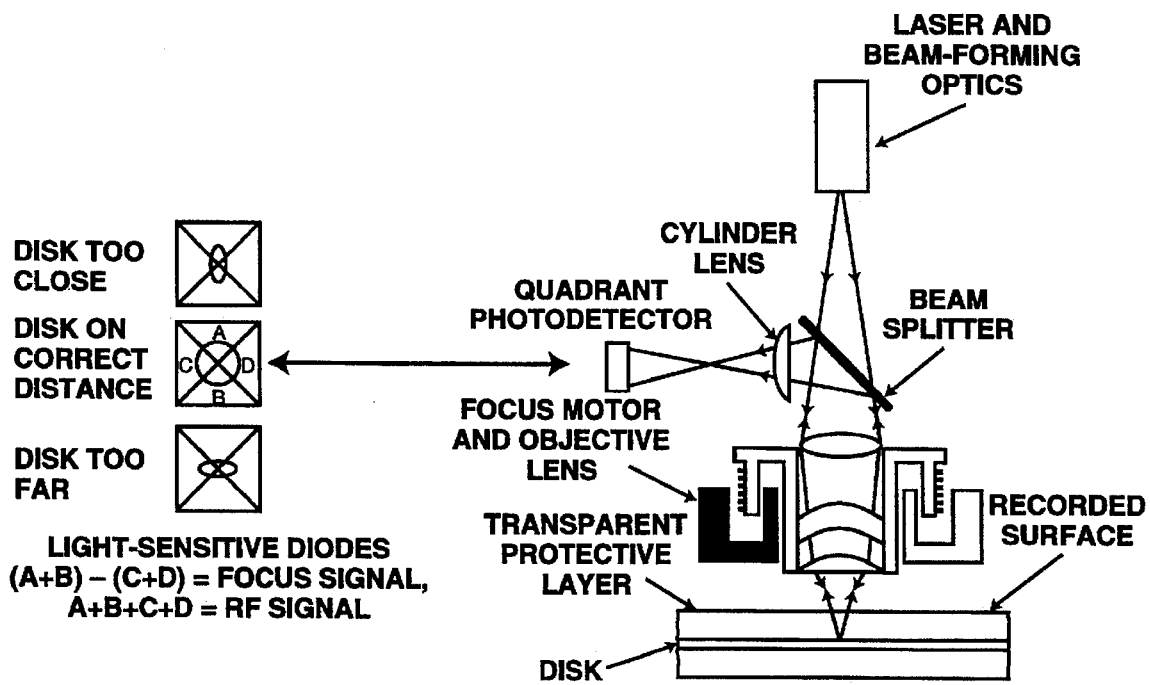
FIG. 2 shows a CD laser and main optical assembly including focusing motor and objective lens.
Figure 3:
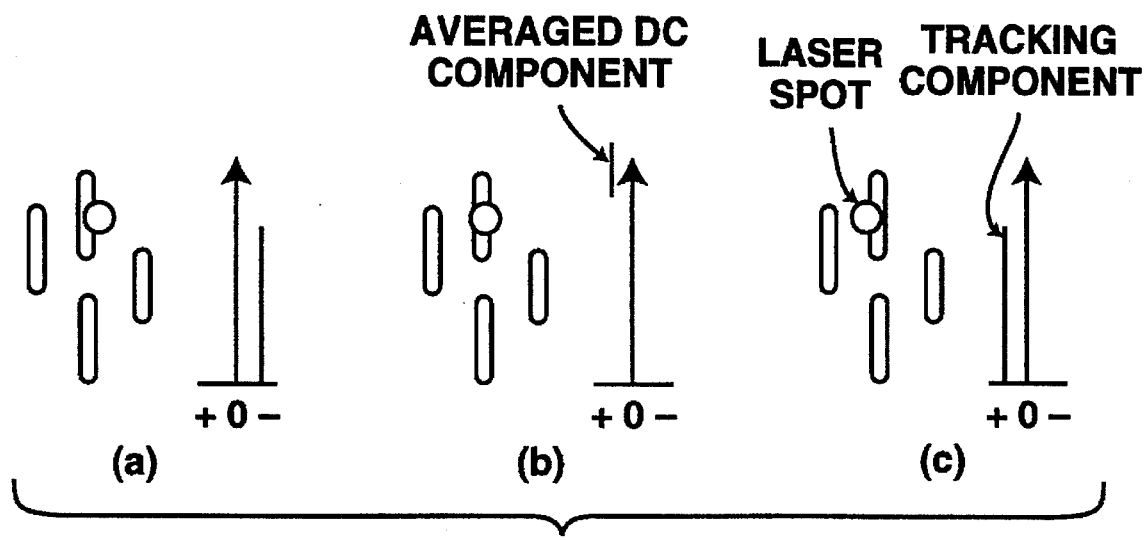
FIG. 3 shows the affects of tracking errors on a single-spot tracking system.
Figure 4:
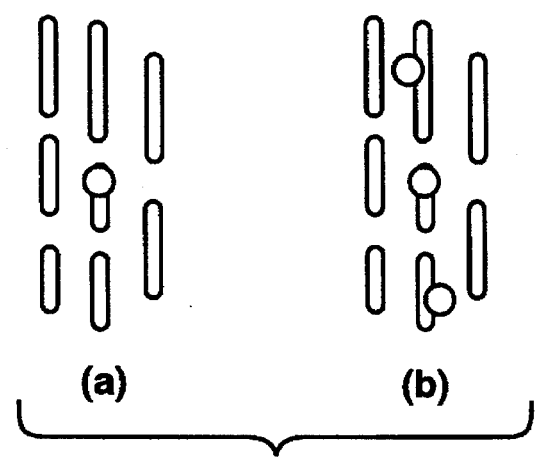
FIG. 4 shows the geometry of a single-spot and a multi-spot data retrieval and tracking system.
Figure 5:
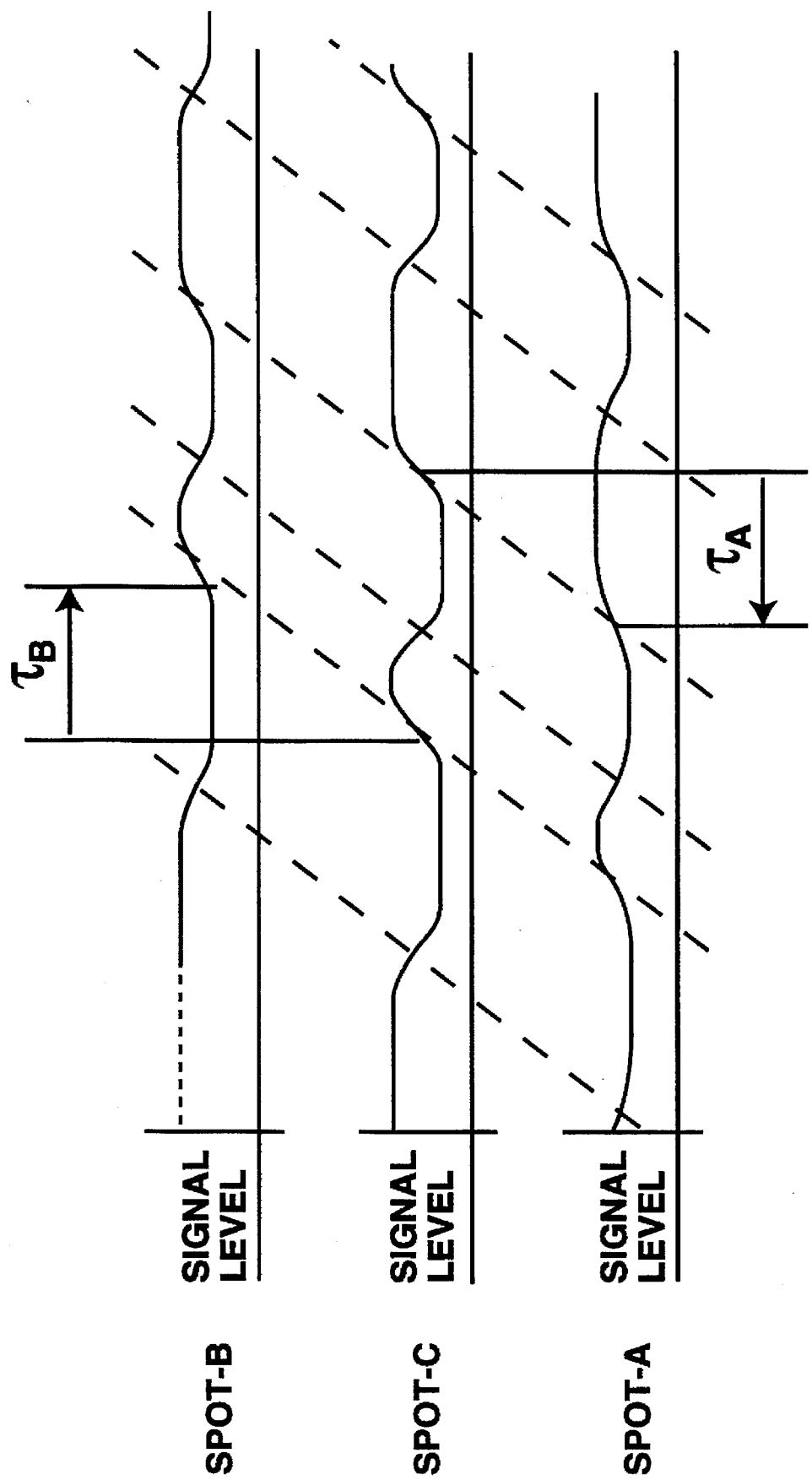
FIG. 5 shows a set of multi-spot output signals.

In the common multi-spot tracking scheme, three spots are used: two for tracking and one for data recovery. The three spots are arranged as shown in FIG. 4(b). When the optical system is properly tracking, the detected output signal levels from the photo-detectors associated with tracking spots A and B and the data recovery spot C are roughly as shown in FIG. 5.

The signal level generated by spot C, is represented by the middle waveform which varies from a high level corresponding to the reflectance level from the lands (unrecorded track segments) and to a low resulting when a pit is recorded. This signal transitions between the lands and pit states are "softened" by the read process due to the convolution of the spot C intensity pattern of finite diameter and the recorded lands to pit transition. This smoothing of the transition occurs even if the original recording has ideally sharp transitions.

Corresponding spot A and B signals are shown respectively below and above the spot C waveform. In this example, spot A precedes spot C by $\tau_A$ seconds and spot B logs spot C by $\tau_B$ seconds. However, this is an arbitrary choice. As will be shown, it is only important that the relative displacement between the spots be known.

The waveforms from spots A and B differ from spot C not only by time displacements, but also because of the non-central portion of the spots A and B are illuminating different edge regions of the pits. Because the pit is scanned by the non-central portion of the beam the transition of the detected pit will be less sharp than for spot C in which the central portion of the illumination provides a more abrupt transition. Also, because less illumination falls on the pit and more on the non-recorded should area, the change in signal level will also be less. Further differences between the three photo-detector output signals will result from the differences in spot shape and illumination distributions, differences in shapes between the two pit edge areas, and noise (i.e., variations due to undefined and/or unpredictable mechanical, electrical and optical sources).

Because the tracking signals (A,B) each contain a signal representative of the data signal recorded as pits and lands along a track, the signal from the central spot C should be capable of being enhanced by properly combining the three photo-detector output signals while still using the two tracking signals for their normal tracking purpose. The combined signal would be an enhanced encoded data signal that is to be sent on to an appropriate demodulator for reconstructing the original data.

Figure 6:
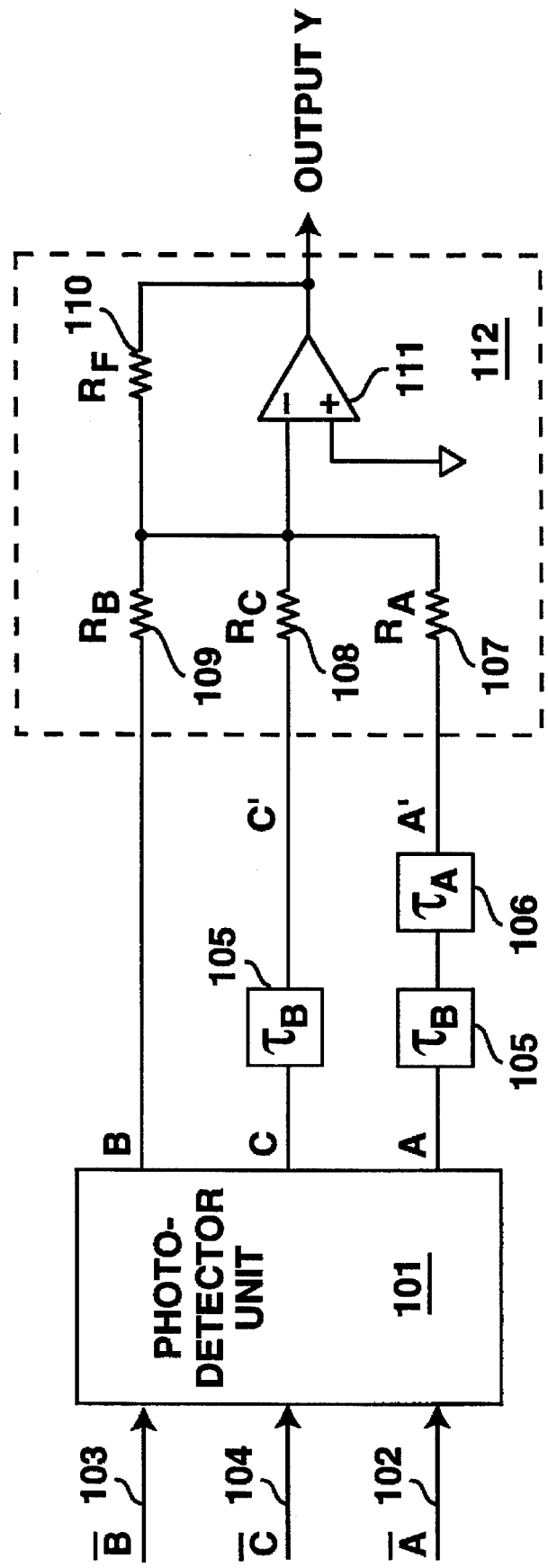
FIG. 6 shows optimal summing of a 3-spot photo-detector output.

FIG. 6 shows an embodiment for combining the three spot photo-detector signals. Photo-detector unit 101 accepts the reflected optical signals from spots $\overline{A}$, $\overline{B}$, and $\overline{C}$ on optical inputs 102, 103, and 104 respectively. The photo-detector unit has three detectors, one for each input, and outputs three electrical signals (A, B, C) that are proportional to the reflected light intensities ($\overline{A}$, $\overline{B}$, $\overline{C}$). The delays $\tau_A$ and $\tau_B$, shown in FIG. 5 are used to set the delay time of delay units 106 and 105, respectively, so that the $\tau_B$ delayed signal C' from delay unit 105 and the ($\tau_A+\tau_B$) delayed signal A' from delay units 105 and 106 are synchronous with signal B. The three signals are summed in summing unit 112, shown as an operational amplifier summary network. The output of summing unit 112 is approximately given by $$y = \left(\frac{R_A}{R_F}\right)A + \left(\frac{R_B}{R_F}\right)B + \left(\frac{R_C}{R_F}\right)C \tag{1}$$

or $$y = w_A \cdot A + w_B \cdot B + w_C \cdot C$$

where $R_A$, $R_B$, $R_C$ and $R_F$ correspond to the values of resistors 107, 108, 109 and 110 respectively, of summing unit 112, and the weight $w_K = R_K/R_F$, for K=A, B, C.

The combining method of FIG. 6 in which the time aligned photo-detector output signal y is a linear combination of the time aligned photo-detector outputs is an optimal combining method when the signals A', B and C' can each be represented as a sum of the true signal x and an additive uncorrelated noise component ($n_A$, $n_B$ or $n_C$) so that $$A = a_A x + n_A$$

$$B = a_B x + n_B \tag{2}$$

$$C = a_C x + n_C$$

where $a_A$, $a_B$, and $a_C$ are signal scale factors, so that from equations (1) and (2)

$$y = w_A(a_A x + n_A) + w_B(a_B x + n_B) + w_C(a_C x + n_C) \tag{3}$$

If a simple quadratic cost function is formed from the error, (y−x), in y, as $$\xi^2 = E\{(y-x)^2\} \tag{4}$$

where $E\{\cdot\}$ is the expected value of the argument. Then the values of $w_A$, $w_B$, and $w_C$ that minimized $\xi^2$ are given by $$w_A = \frac{1}{a_A}\left[\frac{S_A}{1+S_A+S_B+S_C}\right] \tag{5}$$

$$w_B = \frac{1}{a_B}\left[\frac{S_B}{1+S_A+S_B+S_C}\right]$$

$$w_C = \frac{1}{a_C}\left[\frac{S_C}{1+S_A+S_B+S_C}\right]$$

-continued $$S_A = a_A^2 \overline{x^2}/\overline{n_A^2}$$

$$S_B = a_B^2 \overline{x^2}/\overline{n_B^2}$$

where $$S_C = a_C^2 \overline{x^2}/\overline{n_B^2}$$

$$\overline{x^2} = E\{x^2\}$$

and $\overline{n_K^2} = E\{n_K^2\}$, K=A, B, or C. It should be noted that this method of combining is readily extendible to more than three input signals. Thus, the ratios $S_A$, $S_B$, and $S_C$ are the signal to noise ratios of A, B, and C and $a_A$, $a_B$, and $a_C$ are the average relative signal gain factors for each spot reflected signals. If the system is properly tracking and spots A and B are symmetrically and laterally displaced relative to the center spot C, so that $a_A \cong a_B$, and $a_A$ and $a_B$ is less than $a_C$. Also, if spots A and B are positioned to fall halfway in the pits and halfway out, $a_A$ and $a_B$ would have values of approximately $a_C/2$. In any case, the signal gain factors can be either estimated from the known track and spot geometry or measured using averaging techniques. Once the signal gain factors are known, the signal energy from each photo-detector output signal may be extracted, leaving the noise energy values ($\overline{n_A^2}$, $\overline{n_B^2}$, $\overline{n_C^2}$). Another method would use the computed auto correlation or spectrum for estimating the signal to noise ratios and relative gain of each channel. The relative gain is sufficient for combining the signals because the resulting weighted sum yields a combined signal with the optimal signal to noise ratio.

Figure 7:
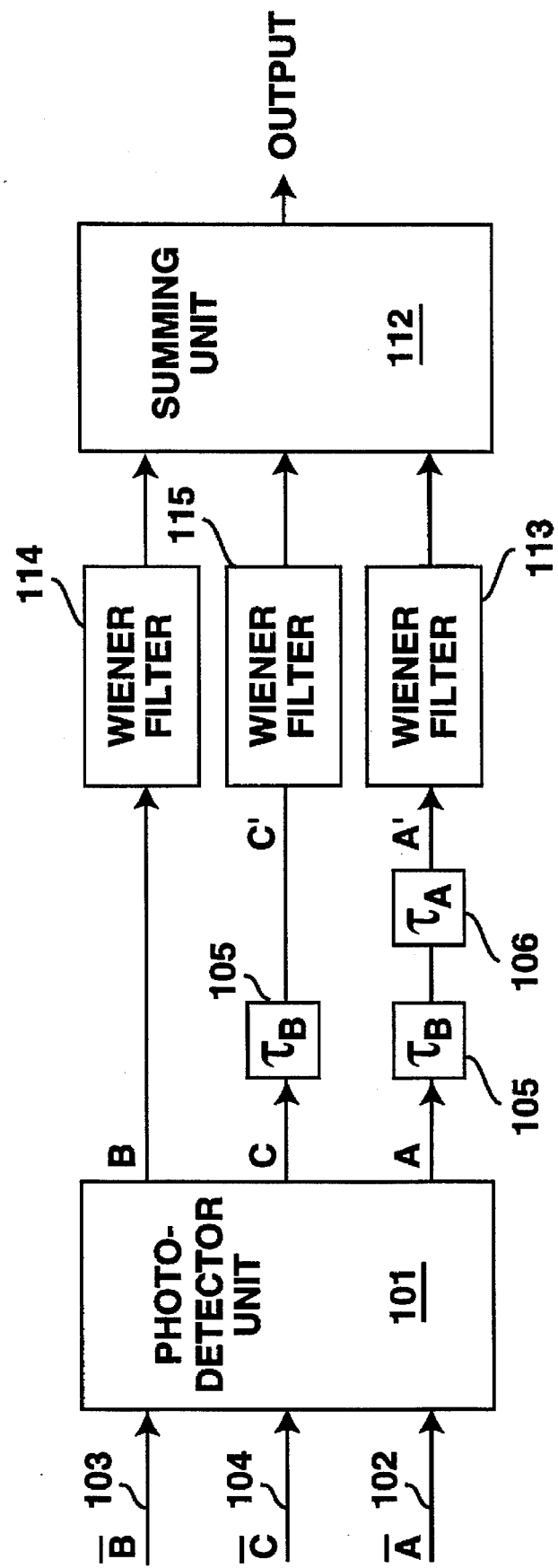
FIG. 7 shows Wiener filtering of the 3-spot photo-detector output.

In another embodiment, shown in FIG. 7, signal B and A are applied to the input of filters 113 and 114, respectively. The function of Wiener filters 113, 114, and 115 is to minimize the error in estimating the time (smooth) recorded data waveform based on the statistical properties of the true signal spectrum and additive noise spectrum. The methods for designing optimal linear filters are well known in art. (For example, see Lee, Y. W., "Statistical Theory of Communications," John Wiley and Sons, Inc., 1960, pp. 355–426.) The output of the three filters is combined by summing unit 112 for producing the sum of three minimal error recorded waveform estimates, each estimate weighted in accordance with the weights of equation (5).

Figure 8:
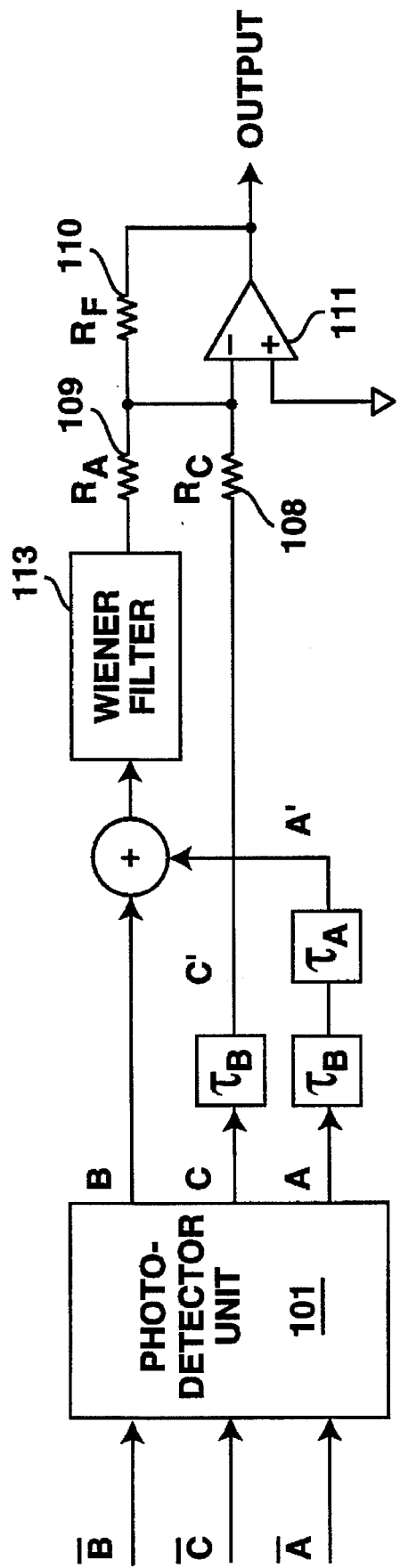
FIG. 8 shows a simplified Wiener filter for 3-spot combining.

FIG. 8 shows a simpler configuration that may be used in place of the system shown in FIG. 7 whenever the system has a high degree of symmetry between signals $\overline{A}$ and B. If the underlying waveform in $\overline{A}$ and B are the same as that in $\overline{C}$, and the signal-to-noise ratios of $\overline{A}$ and B are comparable the two may be summed prior to filtering to allow a single filter to be used for optimizing the tracking signal before combining in the summing network comprising resistors 108–110 and operational amplifier 111. The values of $R_A/R_F$ and $R_C/R_F$ would be chosen to optimize the output signal by letting $$w_A = R_A/R_F = \frac{1}{a_A}\left[\frac{S_A}{1+S_A+S_C}\right] \quad (6)$$

$$w_C = R_C/R_F = \frac{1}{a_C}\left[\frac{S_C}{1+S_A+S_C}\right].$$

Implementation of fixed design filters, such as filters 113–115, requires knowledge of the second order statistics of the signal and noise. Further, a fixed design implicitly assumes that these statistics are stationary. This may not be the case when, for example, the waveform second order statistics change due to the form of encoding or due to a change in data types (e.g. music and numerical tables of functions). Also, different recording and CD production methods may lead to different noise static. Under these circumstances, an adaptive filter combining method may be preferred in which updating statistical estimates of the essential parameters are made and used to control the characteristics of the Wiener or other (e.g. Kalman) filter types. (For example, for Kalman filtering, see Mohanty, N., "Random Signals Estimation and Identification," Van Nostrand Reinhold Co., N.Y., 1986, pp. 476–509; also Gelb, A., Editor, "Applied Optimal Estimation," MIT Press, Cambridge, Mass., 1974, pp. 119–143.)

Figure 9:
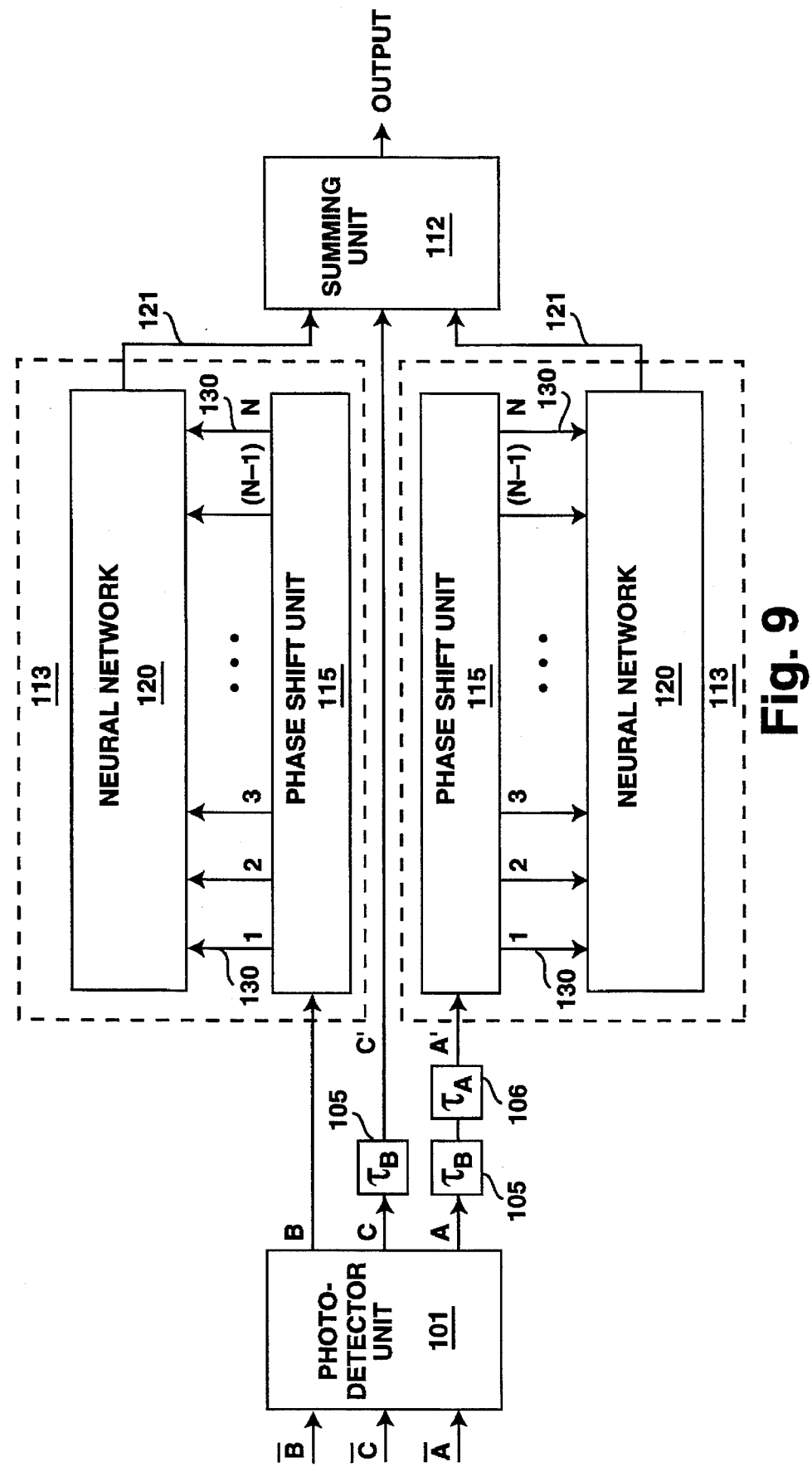
FIG. 9 shows a neural network and tapped phase shift unit combining system.

In another embodiment, shown in FIG. 9, filters using neural networks (NNs) are used. The reasons for using NNs is that they can be made adaptive so that the filter characteristics may be updated as required. Additionally, NNs are capable of providing both linear and nonlinear filtering in an optimized fashion without requiring apriori knowledge of the second order signal and noise statistics. It is only required that the input signals to the NN have enough delay variety to allow the no-memory neural networks to optimally adjust for minor time and pulse shifts between the tracking signals and the center spot signal.

The system of FIG. 9 includes a photo-detector 101, delay units 105 and 106, and summing unit 112, all as previously described. Two filter units are provided, each including phase shift unit 115 and neural network 120. The purpose of phase shift unit 115 is to provide an information preserving mapping of the continuous input signal (A' or B) into a sampled domain where the sampled values are on the phase shifter 115 output lines 130. In this manner, the neural network 120 is provided with N representations of the input signal all having variously phase shifted frequency components of the original signal. In other words, each tap 130, differs by the delays introduced by phase shift unit 120 at various frequencies. The neural network may use this delay (or phase) variety in adjusting for phase shifts inherent in signals A' and B which have been only grossly adjusted by the time delay networks 105 and 106. The filter taps 130 are used to provide fine phase and delay adjustments. A large variety of filter networks will satisfy this requirement.

Figure 10:
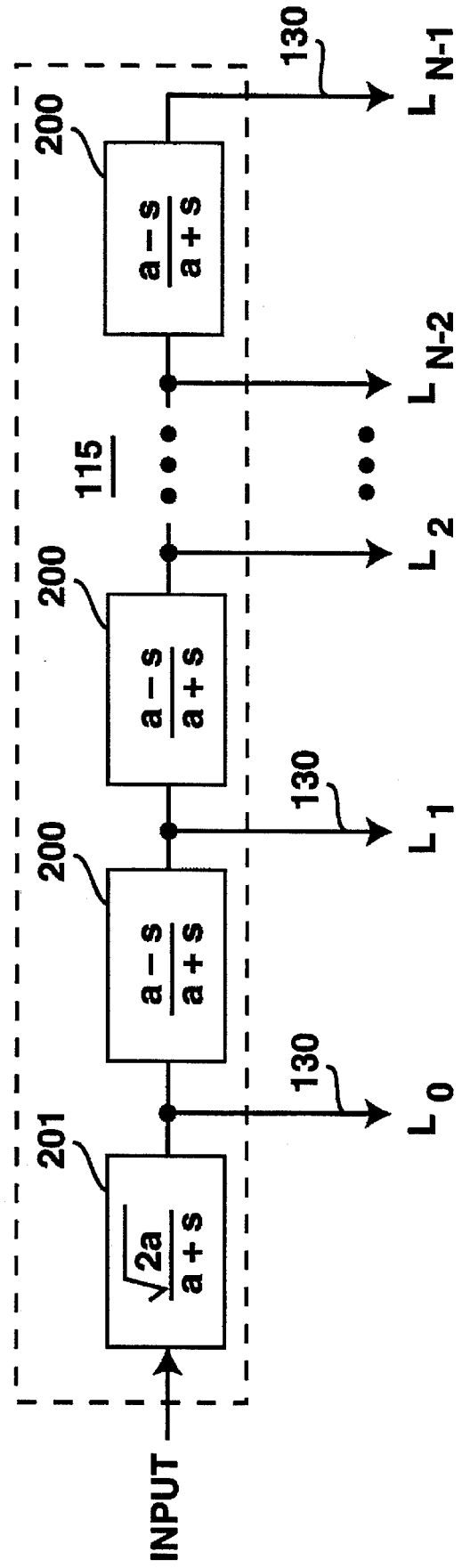
FIG. 10 shows a tapped Laguerre phase shift filter structure.
Figure 11:
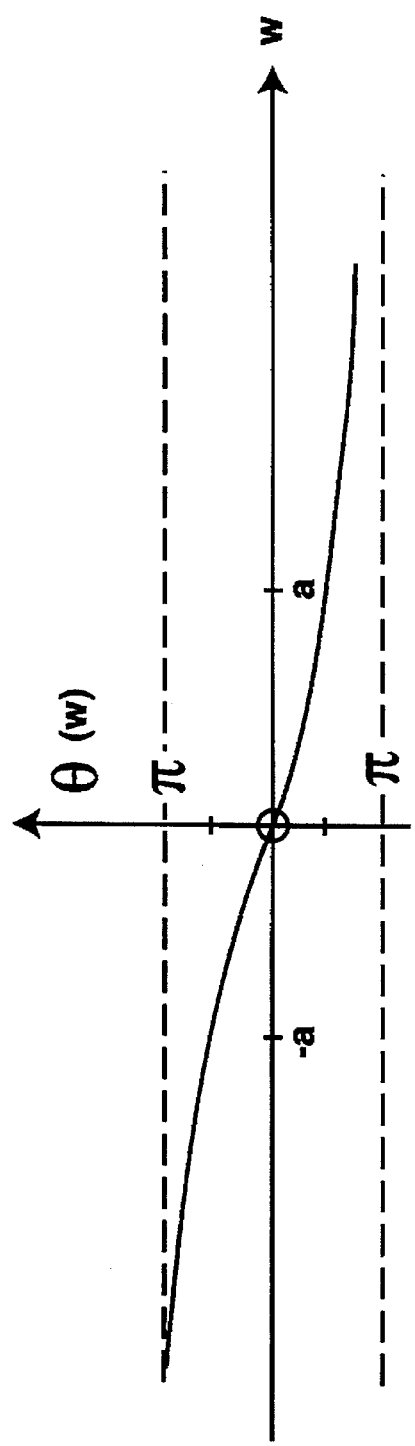
FIG. 11 shows the phase shift of each Laguerre filter unit.

For example, consider the filter network shown in FIG. 10 in which there are N output taps labeled $L_0$–$L_{N-1}$, corresponding to output taps 130 of FIG. 9, and N identical all-pass phase shifting networks 200 connected in tandem. The s-plane transfer function for each network 300 is $$H(s)=(a-s)/(a+s) \quad (7)$$

and corresponds to an all-pass network having a phase shift characteristic, $\theta(\omega)$, as follows:

$$\theta(\omega)=-2\tan^{-1}(\omega/a) \quad (8)$$

and as shown in FIG. 11.

Network 201 with its low-pass transfer characteristic of $$A(s)=\sqrt{2a}/(a+s) \quad (9)$$

is optional for the purposes of this invention but is recommended because the transfer functions between the input terminal and, say, output tap $L_n$ is $$L_n(s) = \frac{\sqrt{2a}}{a+s}\left(\frac{a-s}{a+s}\right)^n \quad (10)$$

which corresponds to the Laplace transform of the $n^{th}$ order Laguerre polynomial, $I_n(t)$, where $$I_n(t) = \sqrt{2a} \left[ \frac{(2a)^n}{n!} t^n - \frac{n(2p)^{n-1}}{(n-1)!} t^{n-1} + \right. \tag{11}$$

$$\frac{n(n-1)(2p)^{n-2}}{2!(n-2)!} t^{n-2} -$$

$$\left. \frac{n(n-1)(n-2)(2p)^{n-3}}{3!(n-3)!} t^{n-3} + \ldots \right] e^{-at}$$

The set of Laguerre polynomials, $\{l_n(t)\}$, are a complete orthogonal set. Being orthogonal, the N output taps 130 will tend to be uncorrelated and thus provide a highly non-redundant set of values to the input of neural network 115. If the first layer of neurons in NN 120 is made up of McCulloch-Pitts (M-P) type neurons, the output of each synaptic processor associated with each M-P type neuron would correspond to the output of a filter having an impulse response function that is the sum of N synaptic weighted Laguerre functions.

Other orthogonal filter structures can be used for phase shift unit 115 (for example, by Lee op. cit., pp. 481–501.)

Figure 12:
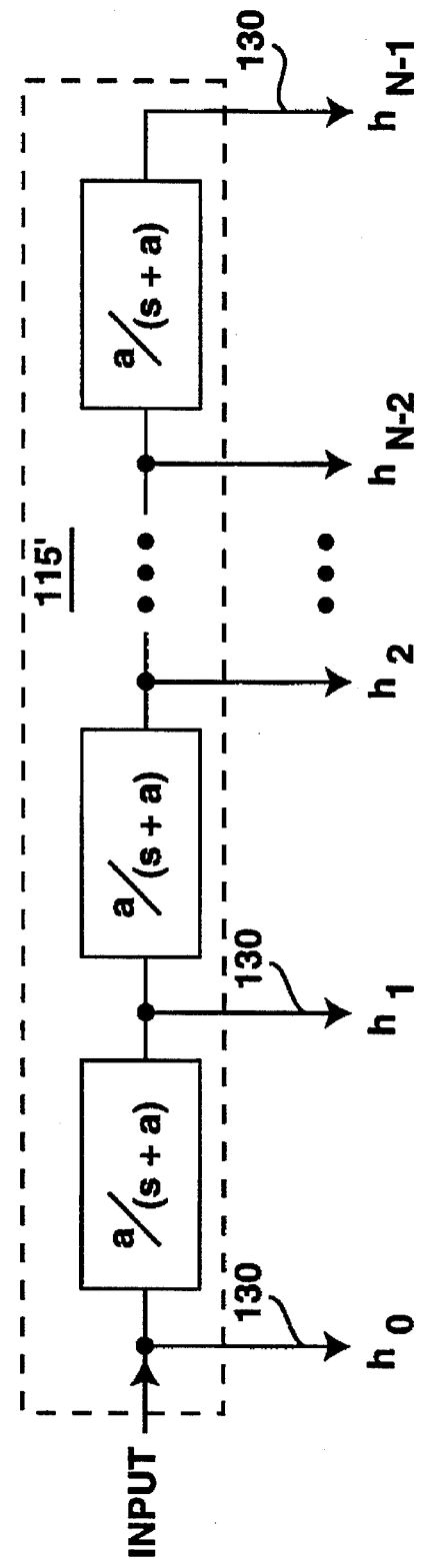
FIG. 12 shows a low-pass phase shift filter unit.

However, orthogonality of the impulse responses of the tapped filter structure is not necessary and the serial concatenation of low-pass single pole filters, such as shown in FIG. 12 may be used. In this case, the transfer function of each segment is given by $$H(s) = a/(s+a) \tag{12}$$

Figure 13:
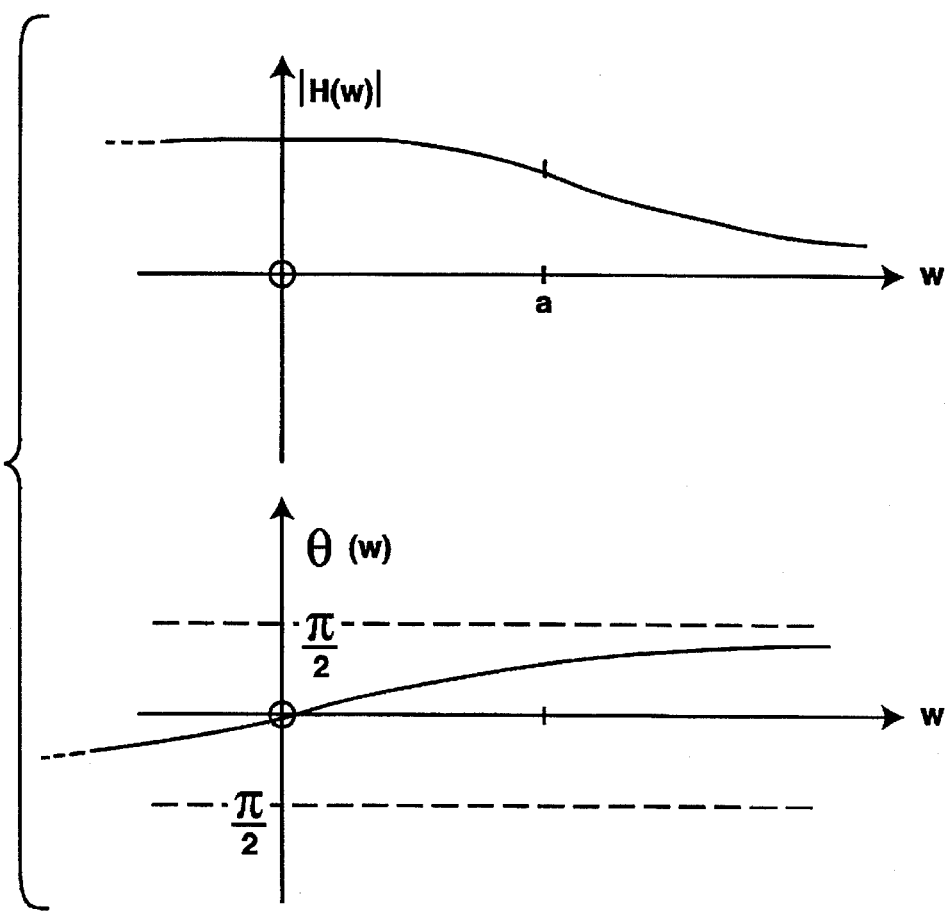
FIG. 13 shows the frequency amplitude and phase response of each low pass unit.

The frequency amplitude response function is $$H(\omega) = \left[ \frac{a^2}{a^2 + \omega^2} \right]^{\frac{1}{2}} \tag{13}$$

and the phase function is $$\theta(\omega) = -\tan^{-1}(\omega/a) \tag{14}$$

as shown in FIG. 13. It is clear that this simpler network does not have the uniform all-pass characteristic of the Laguerre type but it may be shown that it provides a large variety of phase shifts (delays) for each frequency component while being information preserving.

The output of the taps of the low pass filter structure of FIG. 12 maps each frequency component from the s-plane corresponding to the input signal continuous domain to the z-plane corresponding to the function observed across the discrete filter taps 130. For example, the phase function of FIG. 13 shows that a different phase shift occurs at each frequency and hence the phase difference between each tap 130 is a constant but different value for each frequency. Thus, zero frequency ($\omega=0$) has zero phase shift while at $\omega=a$, a $\pi/4$ phase difference occurs at each tap and at $\omega=\infty$, the phase shift is $\pi/2$ between taps. Hence, a sinusoid at $\omega=a$ appears as a sinusoid across the taps sampled at $\pi/4$ intervals while an infinite frequency (if the gain were not zero) would be a sinusoid sampled at $\pi/2$ intervals. Filter unit 115' of FIG. 12 compresses the entire infinite spectrum to within $\pm \pi/2$ on the unit circle of the z-plane and hence is information preserving.

Thus, the desirable feature of filter unit 115 being information preserving while providing a variety of phase shifts (delays) is easily satisfied as along as the phase shift at all pertinent signal frequencies at each tap is uniformly incremented, and the phase increment varies monotonically with frequency.

The circuit implementation for each filter segment is well known in the art (e.g. op. cit. Lee; and Irvine, R. G., "Operational Amplifier Characteristics and Applications", Prentice-Hall, Inc., Englewood Cliffs; N.J., 1981, pp. 311–313).

Referring again to FIG. 9, neural network 120 is a multilayer network comprising a hidden layer and an output layer of M-P type neurons, each neuron having a substantial linear region in its output actuation function so that if nonlinear distortions in the tracking signals (A' and B) are non-existent, the neurons would tend to operate linearly.

Figure 14:
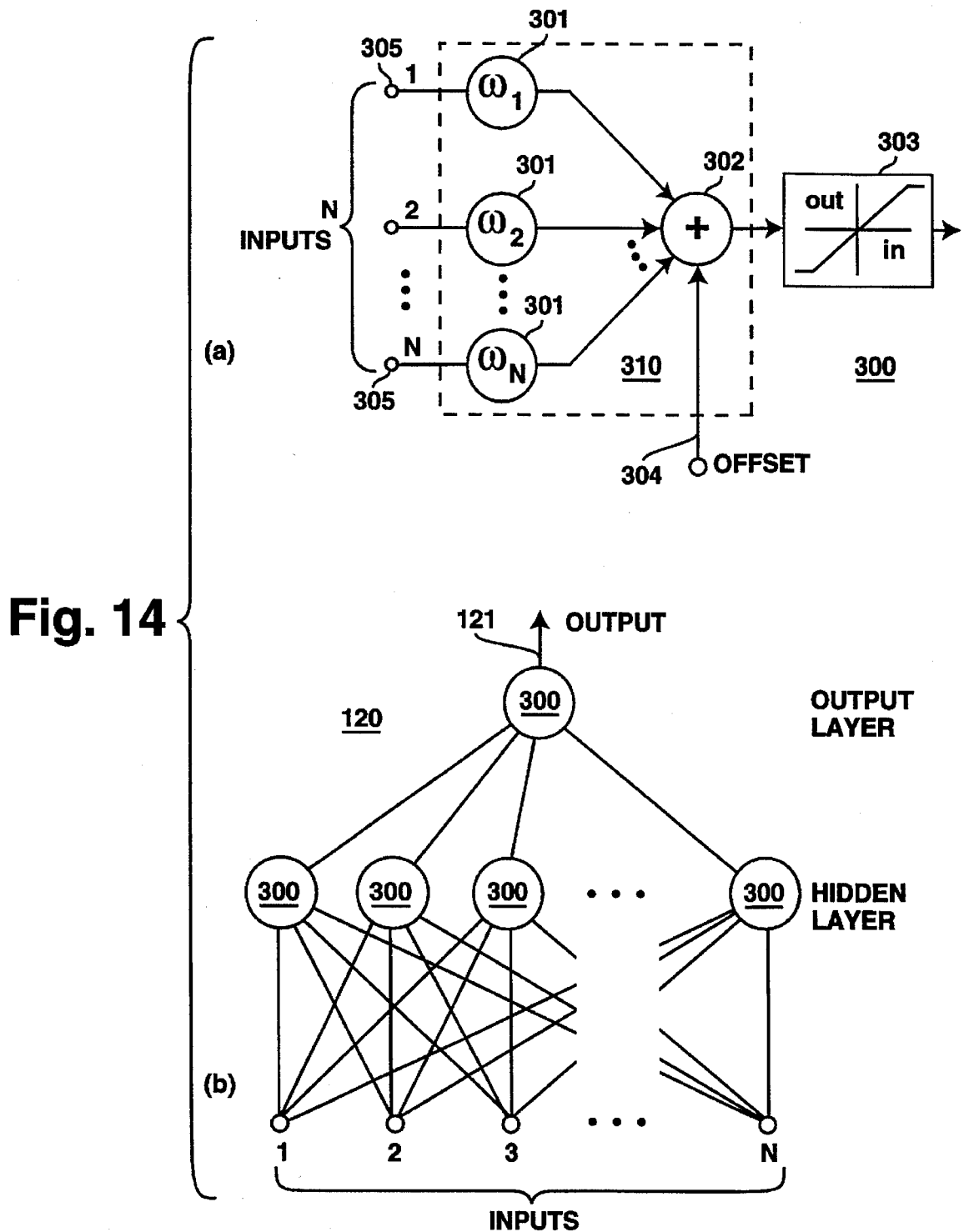
FIG. 14 shows a neural network comprised of M-P type neurons.

FIG. 14(a) depicts a neural network 120 with N input terminals, a multiplicity of M-P type neurons 300 in the hidden layer, and an output layer of one M-P type neuron. The M-P neuron 300, shown in FIG. 14(b) has N input terminals 305, connected to synaptic processor 310 that scales each input signal by a set of weights 301 and forms the weighted sum at the output of summer 302. An optional offset input 301 is also provided. The output of synaptic processor 310 is applied to the input of activation function unit 303 which has a sigmoidal transfer characteristic that is substantially linear over its central region.

Each neural network 120 may be trained by applying appropriate synthesized exemplar input signals A' and B and comparing the resulting outputs 121 with an exemplar response signal representative of the desired output.

Figure 15:
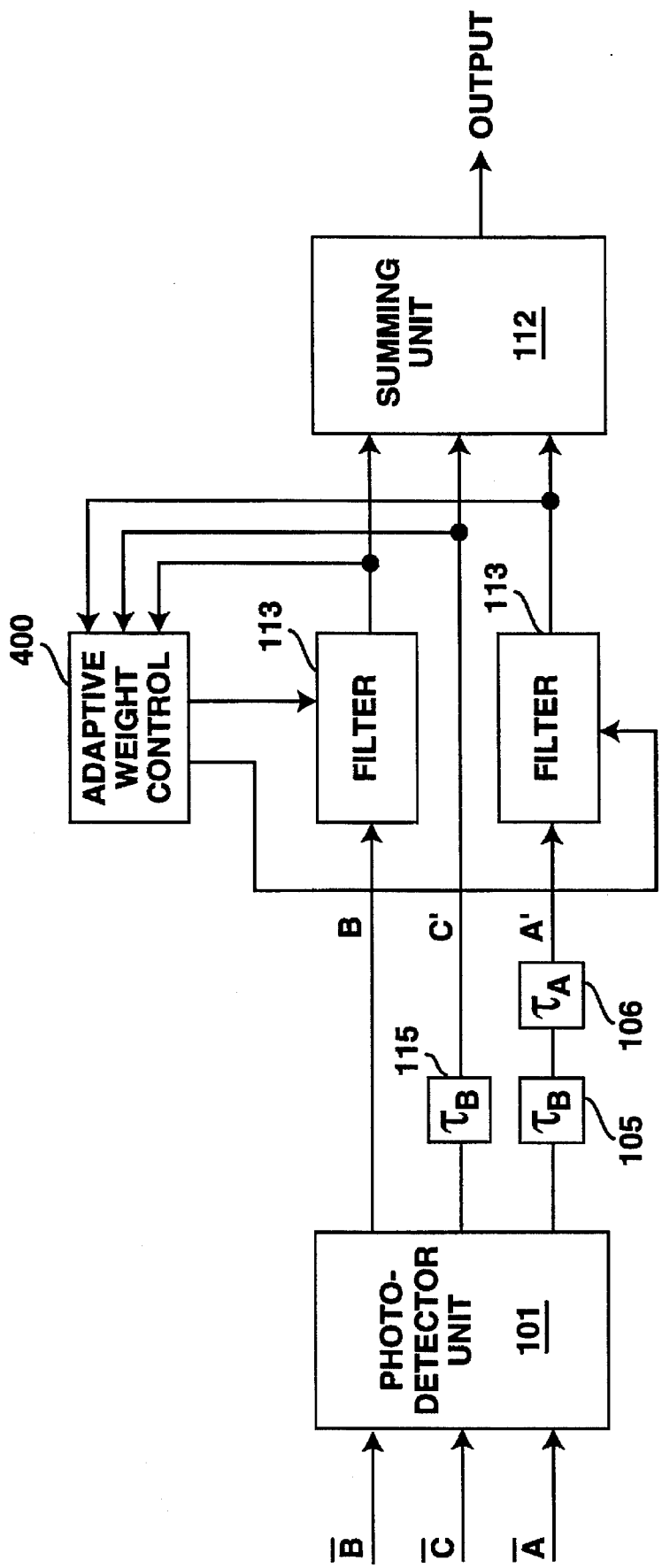
FIG. 15 shows an adaptive neural network combining system.

Alternatively, a self boot-strapping adaptive training procedure could be implemented as shown in FIG. 15, by including an adaptive weight controller 400 that compares the signal C' with the output of filter 113 and derives from the comparison a set of corrections that are applied to the weights 301 of each neuron 300 in both neural networks 120 of filter 113. Training algorithms, such as the back-propagation algorithm, are well known in the art (e.g. Hertz et al., "Introduction to the Theory of Neural Computation," Vol. 1, Addison-Wesley Publishing Co., 1991, pp. 115–141). Adaptive weight controller would typically include a microprocessor, analog-to-digital converters for sampling and quantizing the input corrections based on the input data and stored values of the neural networks' current weight set and activation function transfer characteristics, and providing a set of control signals for adjusting each weight (Bernard Widrow and Samuel D. Stearns, "Adaptive Control Systems," Adaptive Signal Processing, Chapter 11, Prentice-Hall, pp. 270–301 (1985)).

Another embodiment of the system of FIG. 9 is based on using a single neural network with 2N input terminals for accepting both phase shift unit 115 outputs of N each, so that the input to summer unit 112 is reduced to the single neural network output and the center spot signal C'.

Another embodiment of the system of FIG. 9 results when signals B and A' can be summed as in FIG. 8, so that a phase shift unit 115 and neural network 120 may be used.

Another embodiment is a two-spot laser and detector arrangement in which only tracking spots A and B are used for both tracking and signal detection. The sum of A' and B would provide the signal and the difference (A'–B) would provide tracking information. By eliminating signal C' and associated apparatus, any of the systems shown in FIGS. 6–9 and 15 could be used.

It should be noted that summing unit 112 can be implemented as a neural network operating in the substantially linear portions of their activation function transfer characteristics.

It should also be noted that the principles described for enhancing the recovered recorded data through the use of three laser spots for illuminating the recorded data trade may be extended to more than three laser spots by adjusting for the relative delays between the laser spot signals and combining the delay adjusted signals by one of the methods described. The plurality of laser beam spots in excess of three may be radially centered on the track for obtaining the best signal representation. If a single laser spot tracking system is employed, all laser spots may be adjusted to be radially centered on the track and the corresponding signals combined for output data signal enhancement. Also, in the single laser spot tracking system, the combined plurality of laser spot signals may also be used in place of the single spot signal for tracking control.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A compact disc (CD) read sensor apparatus for reading data in a CD system, and from discs in similar disc storage systems using optical read techniques, from a track with a pre-recorded data signal on a recording surface, the CD system including a plurality of laser beams for illuminating the track, each beam having known relative positions so that each beam illuminates a spot on the recording surface bearing a known relationship relative to any other spot, a servo-system for controlling the plurality of laser beams so that the plurality of laser beams are radially centered about the track, the servo-system using at least a first and a second laser beam, the first laser beam spot nominally centered radially on one track edge, and the second laser beam spot nominally centered radially on the track other edge so that a difference between each laser beam spot reflection average intensity is representative of the radial position of the first and second laser beam spots, the difference being used to radially adjust the plurality of laser beam spots, and a plurality of photo detector units, one for each laser beam for detecting and converting an associated laser beam spot reflection intensity into an electrical signal at an output, each laser beam spot having a known time delay between when each laser beam spot causes reading of common recorded events to be detected by each associated photo detector unit, the CD read sensor apparatus comprising a combining network with a plurality of inputs, each input connected to a distinct associated photo detector for producing an output read signal representative of the pre-recorded data, the combining network comprising, (a) a delay circuit for removing the known relative time delay between the plurality of laser beam spot reflection signals obtained from each associated photo detector, and producing a plurality of synchronous output signals representative of each laser beam spot reflection signal without a relative time delay; and (b) a combining circuit comprising a neural network with a plurality of at least two inputs, each input connected to a distinct delay circuit synchronous output signal for enhancing reproduction of the pre-recorded data signal by combining the plurality of synchronous output signals from the delay circuit to form a single output read signal that is a more accurate representation of the pre-recorded data signal than any one laser beam spot reflection signal.

2. A compact disc (CD) read sensor apparatus for reading data in a CD system, and from discs in similar disc storage system using optical read techniques, from a track with a pre-recorded data signal on a recording surface, the CD system including a plurality of laser beams for illuminating the track, each beam having known relative positions so that each beam illuminates a spot on the recording surface bearing a known relationship relative to any other spot, at least one of the plurality of laser beams, hereinafter referred to as the read laser beam, is nominally radially positioned so that the read laser beam spot is centered on the track for reading the pre-recorded data signal, a servo-system using at least a first and a second laser beam, the first laser beam spot nominally centered radially on one track edge, and the second laser beam spot nominally centered radially on the track other edge so that a difference in each laser beam spot reflection average intensity is representative of the radial position of the first and second laser beam spots, the difference being used to radially adjust the plurality of laser beam spots, and a plurality of photo detector units, one for each laser beam for detecting and converting an associated laser beam spot reflection intensity into an electrical signal at an output, each laser beam spot having a known time delay between when each laser beam spot causes reading of common recorded events to be detected by each associated photo detector, the CD read sensor apparatus comprising a combining network with a plurality of inputs, each input connected to a distinct photo detector output, for producing an output read signal with improved accuracy, the combining network comprising:

(a) a delay circuit for removing the known relative time delay between the plurality of laser beam spot reflection signals obtained from each photo detector, and producing a plurality of synchronous output signals representative of the plurality of beam spot reflection signals without any relative time delay; and (b) a combining circuit comprising a neural network with a plurality of at least three inputs, each input-connected to a distinct delay circuit synchronous output signal, for enhancing reproduction of the pre-recorded data signal by combining the plurality of synchronous output signals of the delay circuit to form a single output read signal that is a more accurate representation of the pre-recorded data signal than any one laser beam spot reflection signal.

3. A compact disc (CD) read sensor apparatus for reading data in a CD system, and from discs in similar disc storage system using optical read techniques, from a track with a pre-recorded data signal on a recording surface, the CD system including a plurality of laser beams for illuminating the track, each beam having known relative positions so that each beam illuminates a spot on the recording surface bearing a known relationship relative to any other spot, at least one of the plurality of laser beams, hereinafter referred to as the read laser beam, is nominally radially positioned so that the read laser beam spot is centered on the track for reading the pre-recorded data signal, a servo-system using at least a first and a second laser beam, the first laser beam spot nominally centered radially on one track edge, and the second laser beam spot nominally centered radially on the track other edge so that a difference in each laser beam spot reflection average intensity is representative of the radial position of the first and second laser beam spots, the difference being used to radially adjust the plurality of laser beam spots, and a plurality of photo detector units, one for each laser beam for detecting and converting an associated laser beam spot reflection intensity into an electrical signal at an output, each laser beam spot having a known time delay between when each laser beam spot causes reading of common recorded events to be detected by each associated photo detector, the CD read sensor apparatus comprising a combining network with a plurality of inputs, each input connected to a distinct photo detector output, for producing an output read signal with improved accuracy, the combining network comprising:

(a) a delay circuit for removing the known relative time delay between the plurality of laser beam spot reflection signals obtained from each photo detector, and producing a plurality of synchronous output signals representative of the plurality of beam spot reflection signals without any relative time delay; and (b) a combining circuit comprising,
 (i) a first and a second phase shift filter unit each having an input terminal, and a multiplicity of output terminals such that any two successively indexed output terminals have output signals at any given frequency that have an approximately fixed phase difference, the fixed phase difference increasing monotonically with frequency, the input terminals respectively connected to the delay circuits output signals corresponding to the first and second laser beam spot reflection signals,
 (ii) a first and second neural network having a multiplicity of input terminals, each input terminal connected to a distinct phase shift filter output terminal for providing respectively a first and second neural network output signal, each an optimal representation of the pre-recorded data signal, and
 (iii) a summing unit for providing a weighted sum of the delay circuit output signal representative of the read laser beam spot reflection signal, and the first and second neural network output signals for producing a weighted sum signal that is a minimized error representation of the pre-recorded data signal.

4. The compact disc (CD) read sensor apparatus of claim 3 wherein the first and second neural networks are trained by comparing the first and second neural network output signals with an exemplar signal corresponding to the read laser beam spot reflection signal.

5. The compact disc (CD) read sensor apparatus of claim 3 wherein the first and second phase shift filter units comprise a concatenation of similar filter circuits serially connected with output taps at the input and output of the first and second phase shift filter units and at interconnected terminals of the similar filter units.

6. The compact disc (CD) read sensor apparatus of claim 5 wherein each filter circuit is a single-pole low pass filter.

7. The compact disc (CD) read sensor apparatus of claim 5 wherein each filter circuit is substantially an all-pass network in the frequency range of the read laser beam spot reflection signal.

8. The compact disc (CD) read sensor apparatus of claim 5 wherein the first and second phase shift filter units have input to output tap transfer functions with impulse responses corresponding to Laguerre functions of the same order as the tap index, n, where for a multiplicity of N output taps, $0 \leq n \leq N-1$.

9. A method for reading data from a compact disc (CD) in a CD system, and from discs in similar disc storage systems using optical read techniques, from a track with a pre-recorded data signal on a recording surface, the CD system including a plurality of laser beams for illuminating the track, each beam having known relative positions so that each beam illuminates a spot on the recording surface bearing a known relationship relative to any other spot, a servo-system for controlling the plurality of laser beams so that the plurality of laser beams are radially centered about the track, the servo-system using at least a first and a second laser beam, the first laser beam spot nominally centered radially on one track edge, and the second laser beam spot nominally centered radially on the track other edge so that a difference between each laser beam spot reflection average intensity is representative of the radial position of the first and second laser beam spots, the difference being used to radially adjust the plurality of laser beam spots, and a plurality of photo detector units, one for each laser beam for detecting and converting an associated laser beam spot reflection intensity into an electrical signal at an output, each photo detector unit output signal has a known time delay with respect to each of the other output signals due to any relative displacement of laser beam spots along the track, the method for reading data comprising:

(a) selectively delaying the plurality of photo-detector unit output signals so that any recorded event occurs substantially simultaneously for producing a plurality of synchronous signals; and (b) combining the plurality of synchronous signals from step (a) by using neural network methods so that the combined signal is a more accurate representation of the pre-recorded data signal.

10. A method for reading data from a compact disc (CD) in a CD system, and from discs in similar disk storage systems using optical read techniques, from a track with a pre-recorded data signal on a recording surface, the CD system including a plurality of laser beams for illuminating the track, each beam having known relative positions so that each beam illuminates a spot on the recording surface bearing a known relationship relative to any other spot, one of the plurality of laser beams, hereinafter referred to as the read laser beam, is nominally radially positioned so that the read laser beam spot is centered on the track for reading the pre-recorded data signal, a servo-system using at least a first and a second laser beam, the first laser beam spot nominally centered radially on one track edge, and the second laser beam spot nominally centered radially on the track other edge so that a difference of each laser beam spot average reflection intensity is representative of the radial position of the first and second laser beam spots, the difference being used to radially adjust the plurality of laser beam spots, and a plurality of photo detector units, one for each laser beam for detecting and converting an associated laser beam spot reflection intensity into an electrical signal at an output, each photo detection unit output signal having a known time delay with respect to each of the other output signals due to any relative displacement between laser beam spots along the track, the method for reading data comprising:

(a) selectively delaying the photo detector unit output signals so that any recorded event occurs substantially simultaneously for producing a plurality of synchronous signals; and (b) combining the plurality of synchronous signals from step (a) by using neural network methods so that the combined signal is a more accurate representation of the pre-recorded signal.

11. A compact disc (CD) read sensor apparatus for reading data in a CD system, and from discs in similar disc storage systems using optical read techniques, from a track with a pre-recorded data signal on a recording surface, the CD system including a plurality of laser beams for illuminating the track, each beam having known relative positions so that each beam illuminates a spot on the recording surface bearing a known relationship relative to any other spot, a servo-system for controlling the plurality of laser beams so that the plurality of laser beams are radially centered about the track, the servo-system using at least a first and a second laser beam, the first laser beam spot nominally centered radially on one track edge, and the second laser beam spot nominally centered radially on the track other edge so that a difference between each laser beam spot reflection average intensity is representative of the radial position of the first and second laser beam spots, the difference being used to radially adjust the plurality of laser beam spots, and a plurality of photo detector units, one for each laser beam for detecting and converting an associated laser beam spot reflection intensity into an electrical signal at an output, each laser beam spot having a known time delay between when each laser beam spot causes reading of common recorded events to be detected by each associated photo detector unit, the CD read sensor apparatus comprising a combining network with a plurality of inputs, each input connected to a distinct associated photo detector for producing an output read signal representative of the pre-recorded data, the combining network comprising, (a) a delay circuit for removing the known relative time delay between the plurality of laser beam spot reflection signals obtained from each associated photo detector, and producing a plurality of synchronous output signals representative of each laser beam spot reflection signal without a relative time delay; and (b) a combining circuit with a plurality of at least two inputs, each input connected to a distinct delay circuit synchronous output signal for enhancing reproduction of the pre-recorded data signal by combining the plurality of synchronous output signals from the delay circuit to form a single output read signal that is a more accurate representation of the pre-recorded data signal than any one laser beam spot reflection signal, wherein the combining circuit comprises:

(i) a first and a second phase shift filter unit each having an input terminal, and a multiplicity of output terminals such that any two successively indexed output terminals have output signals at any given frequency that have an approximately fixed phase difference, the fixed phase difference increasing monotonically with frequency, the input terminals respectively connected to the delay circuits output signals corresponding to the first and second laser beam spot reflection signals;

(ii) a first and second neural network having a multiplicity of input terminals, each input terminal connected to a distinct phase shift filter output terminal for providing respectively a first and second neural network output signal, each an optimal representation of the pre-recorded data signal; and (iii) a summing unit for providing a weighted sum of the delay circuit output signal representative of the read laser beam spot reflection signal, and the first and second neural network output signals for producing a weighted sum signal that is a minimized error representation of the pre-recorded data signal.

12. The compact disc (CD) read sensor apparatus of claim 11 wherein the first and second phase shift filter units comprise a concatenation of similar filter circuits serially connected with output taps at the input and output of the first and second phase shift filter units and at interconnected terminals of the similar filter units.

13. The compact disc (CD) read sensor apparatus of claim 12 wherein each filter circuit is a single-pole low pass filter.

14. The compact disc (CD) read sensor apparatus of claim 12 wherein each filter circuit is substantially an all-pass network in the frequency range of the read laser beam spot reflection signal.

15. The compact disc (CD) read sensor apparatus of claim 12 wherein the first and second phase shift filter units have input to output tap transfer functions with impulse responses corresponding to Laguerre functions of the same order as the tap index, n, where for a multiplicity of N output taps, $0 \leq n \leq N-1$.

16. A method for reading data from a compact disc (CD) in a CD system, and from discs in similar disc storage systems using optical read techniques, from a track with a pre-recorded data signal on a recording surface, the CD system including a plurality of laser beams for illuminating the track, each beam having known relative positions so that each beam illuminates a spot on the recording surface bearing a known relationship relative to any other spot, a servo-system for controlling the plurality of laser beams so that the plurality of laser beams are radially centered about the track, the servo-system using at least a first and a second laser beam, the first laser beam spot nominally centered radially on one track edge, and the second laser beam spot nominally centered radially on the track other edge so that a difference between each laser beam spot reflection average intensity is representative of the radial position of the first and second laser beam spots, the difference being used to radially adjust the plurality of laser beam spots, and a plurality of photo detector units, one for each laser beam for detecting and converting an associated laser beam spot reflection intensity into an electrical signal at an output, each photo detector unit output signal has a known time delay with respect to each of the other output signals due to any relative displacement of laser beam spots along the track, the method for reading data comprising:

(a) selectively delaying the plurality of photo-detector unit output signals so that any recorded event occurs substantially simultaneously for producing a plurality of synchronous signals;

(b) sequentially phase shift filtering each synchronous output signal produced in step (a) for producing a set of phase shifted output signals, each phase shifted output signal being a sequential set of incrementally phase shifted output signals that, at any given frequency have an approximately fixed phase difference between sequential signals of a given set of incrementally phase shifted output signals, each phase difference varying monotonically with frequency; and (c) combining the sets of phase shifted output signals of step (b) using neural network methods for producing a single output signal that is a minimal error representation of the pre-recorded data signal.

17. A method for reading data from a compact disc (CD) in a CD system, and from discs in similar disk storage systems using optical read techniques, from a track with a pre-recorded data signal on a recording surface, the CD system including a plurality of laser beams for illuminating the track, each beam having a known relative position so that each beam illuminates a spot on the recording surface bearing a fixed relationship relative to any other spot, one of the plurality of laser beams, hereinafter referred to as the read laser beam, is nominally radially positioned so that the read laser beam spot is centered on the track for reading the pre-recorded data signal, a servo-system using at least a first and a second laser beam, the first laser beam spot nominally centered radially on one track edge, and the second laser beam spot nominally centered radially on the track other edge so that a difference of each laser beam spot average reflection intensity is representative of the radial position of the first and second laser beam spots, the difference being used to radially adjust the plurality of laser beam spots, and a plurality of photo detector units, one for each laser beam for detecting and converting an associated laser beam spot reflection intensity into an electrical signal at an output, each photo detection unit output signal having a known time delay relative to each of the other output signals due to any relative displacement between laser beam spots along the track, the method for reading data comprising:

(a) selectively delaying the photo detector unit output signals so that any recorded event occurs substantially simultaneously for producing a plurality of synchronous signals; and (b) sequentially phase shift filtering each synchronous output signal produced in step (a) for producing a set of phase shifted output signals, each phase shifted output signal being a sequential set of incrementally phase shifted output signals that, at any given frequency, have an approximately fixed phase difference between sequential signals of a given set of incrementally phase shifted output signals, each phase difference varying monotonically with frequency; and (c) combining the sets of phase shifted output signals of step (b) using neural network methods for producing a single output signal that is a minimal error representation of the pre-recorded data signal.

* * * * *